United States Patent [19]
Yi

[11] Patent Number: 5,009,206
[45] Date of Patent: Apr. 23, 1991

[54] ROTARY INTERNAL COMBUSTION ENGINE

[76] Inventor: Chong S. Yi, 40-15 79st #4D, Elmhurst, N.Y. 11373

[21] Appl. No.: 436,610

[22] Filed: Nov. 16, 1989

[51] Int. Cl.⁵ .................................................. F02B 53/00
[52] U.S. Cl. .................................... 123/248; 418/222
[58] Field of Search ................ 123/237, 248; 418/104, 418/141, 222

[56] References Cited

U.S. PATENT DOCUMENTS

| | | | |
|---|---|---|---|
| 1,247,973 | 11/1917 | Langteig | 123/248 X |
| 1,270,245 | 6/1918 | Beard | 123/237 |
| 1,333,399 | 3/1920 | Erickson | 123/248 X |
| 1,970,003 | 8/1934 | Fenati | 123/248 X |
| 2,004,563 | 6/1935 | Bogoslowsky | 418/141 |
| 2,760,466 | 8/1956 | Black | 418/222 X |
| 3,824,044 | 7/1974 | Hinckley | 418/141 X |

FOREIGN PATENT DOCUMENTS

| | | | |
|---|---|---|---|
| 437640 | 2/1912 | France | 123/248 |
| 522111 | 3/1921 | France | 123/248 |

*Primary Examiner*—Michael Koczo
*Attorney, Agent, or Firm*—Birch, Stewart, Kolasch & Birch

[57] ABSTRACT

A rotary internal combustion engine which comprises a housing containing an axle, a pair of toroidal casings both disposed in parallel within the housing, the toroidal casings containing a rotor with a piston disposed within the casings, respectively, an on/off valve in a closed position for forming an ignition and explosion zone with the piston disposed in the casings, respectively, and a gas outlet in the on/off valve disposed in the casings, respectively, whereby the rotary internal combustion engine is achieved by continuously transferring a compressed air-fuel mixture into the ignition and explosion zone, igniting and simultaneously exploding the mixture continuously, and exhausting gases of combustion through the gas outlet in the closed valve position, and thereafter, the piston passes through the valve in an open position thereby causing rotation of the rotors with the axle.

17 Claims, 5 Drawing Sheets

ROTARY INTERNAL COMBUSTION ENGINE

BACKGROUND OF THE INVENTION

1. Field of the Invention

The present invention relates to a rotary internal combustion engine and more particularly, to a rotary engine apparatus which includes an upper toroidal casing and a lower toroidal casing having a rotor with a piston, and an ignition and explosion zone disposed between the piston and a valve in a closed position, which are disposed in the toroidal casings, respectively, whereby rotation of the rotor of the rotary engine is achieved by continuously transferring a compressed air-fuel mixture into the ignition and explosion zone, igniting and exploding the mixture continuously, and continuously exhausting the gases of combustion in the closed valve position, and thereafter, the piston passes through the valve in an open position and simultaneously, the gases of combustion do not exhaust.

2. Description of the Prior Art

Various types of internal combustion engines are well known in the art. For example, in the combustion cycle of the conventional piston engine, the piston must always come to a complete stop and reverse direction and the piston requires a connecting rod and crankshaft to convert its up and down motion into a torque. On the other hand, the rotary engine directly generates torque although in some designs of the rotary engine a "top dead center" type of problem still exists. In the rotary engine, the engine is provided which has fewer moving parts, has less weight and occupies less space, for a comparable horsepower.

Furthermore, the piston of the internal combustion engine is inefficient in its use of the power available in the exploded airfuel mixture. If a piston engine has a 3-inch stroke, then the crank distance, i.e. the distance from the center of the drive shaft to the center of the crank bearing where the driving pressure is applied, is 1.5 inches. In the piston engine, the pressure from the explosion is applied with full efficiency only when the connecting rod is at right angles to the crank, i.e., when there is maximum leverage on the crank. Thus, as the crank turns from the top-dead-center position of the piston, where the pressure from the explosion in relation to the torque is zero, the leverage efficiency increases progressively until the right-angle position is achieved, and then drops off until the crankshaft reaches the bottom-dead-center position of the piston, where the leverage efficiency again is zero. Hence, the only significant productive leverage on the crank shaft from the pressure applied is derived between the 2 and 4 o'clock positions of the revolution of the crank shaft. Thus, only at this time is there efficient conversion into power output of the pressure of the explosion of the air-fuel mixture in the piston engine.

Rotary automobile engines have advantages over piston engines in that by the utilization of a rotor, which rotates within a stationary enclosure, the piston of the conventional internal combustion engine is eliminated.

A number of suggestions have been made to employ a rotor mounted for rotation within a stationary casing and including a plurality of retractable vanes mounted substantially radially in the rotor.

A typical example of such a rotary engine is disclosed in U.S. Pat. No. 1,279,195, in which a substantially circular rotor is mounted in an elliptical chamber. U.S. Pat. No. 917,165 also discloses a circular rotor which is mounted in an elliptical casing and provided with vanes which engage the inner walls of the casing. In these prior art engines, the pressure of the compressed gases before ignition tends to prevent the vanes from extending to engage the chamber wall.

Also, the "Wankel" engine includes a three-cornered cam motor mounted in a geared manner to a power take-off shaft. The chamber is of a generally oval cross-sectional shape and each of the three corners of the cam engage the inner wall of the chamber during rotation. In order to achieve this, the cam has a central circular opening having gear teeth on the inner face and these teeth mesh with a small pinion gear mounted on the power take-off shaft. The cam therefore rotates eccentrically about the power take-off shaft.

U.S. Pat. 3,780,708 discloses a rotary combustion engine which includes a rotor concentric with and rotatable about a stator having a plurality of baffles with the rotor and stator cooperatively defining a plurality of working chambers that are spaced about and rotate with the rotor.

U.S. Pat. No. 3,791,353 discloses a rotary engine which includes a plurality of elongated vanes, abutments, recesses, and chambers therein. All of the engines of the above patents are complicate in construction, difficult in use, and expensive to manufacture. Furthermore, such engines have proven to be unpractical for various purpose.

In order to avoid such problems, the present inventor is prosecuting U.S. patent application Ser. No. 07/394,535, filed Aug. 16, 1989, which includes an upper cylindrical casing and a lower cylindrical casing having a rotor with a piston, and an ignition and explosion zone disposed between the piston and a valve in the cylindrical casings, respectively, whereby rotation of the rotor of the rotary engine is achieved by transferring a compressed air-fuel mixture into the ignition and explosion zone, igniting and exploding the mixture, and exhausting the gases of combustion.

SUMMARY OF THE INVENTION

Accordingly, it is an object of the present invention to provide an improved rotary internal combustion engine.

Another object of the present invention is to provide a rotary combustion engine which includes a housing containing an axle, an upper toroidal casing and a lower toroidal casing having a rotor with a piston which are both disposed in parallel within the housing, and an ignition and explosion zone disposed between the piston and a valve in a closed position, which are disposed in the toroidal casings, respectively, whereby the rotation of the engine is achieved by continuously transferring the compressed airfuel mixture into the ignition and explosion zone, igniting and exploding the mixture continuously, and continuously exhausting gases of combustion in the closed valve position, and thereafter, the piston passes through the valve in an open position and simultaneously, the gases of combustion does not exhaust thereby causing the rotation of the rotor with the axle.

A further object of the present invention is to provide a rotary engine which is economical to manufacture and durable in use, and does not suffer from the drawbacks of the prior art, vane-type rotary engines.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly, the present invention relates to a rotary internal combustion engine which comprises a housing containing an axle, a pair of toroidal casings both disposed in parallel within the housing, the toroidal casings containing a rotor with a piston disposed within the casings, respectively, an on/off valve in a closed position for forming an ignition and explosion zone with the piston disposed in the casings, respectively, and a gas outlet in the on/off valve disposed in the casings, respectively, whereby the rotary internal combustion engine is achieved by continuously transferring a compressed air-fuel mixture into the ignition and explosion zone, igniting and simultaneously exploding the mixture continuously, and exhausting gases of combustion through the gas outlet in the closed valve position, and thereafter, the piston passes through the valve in an open position thereby causing rotation of the rotors with the axis.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
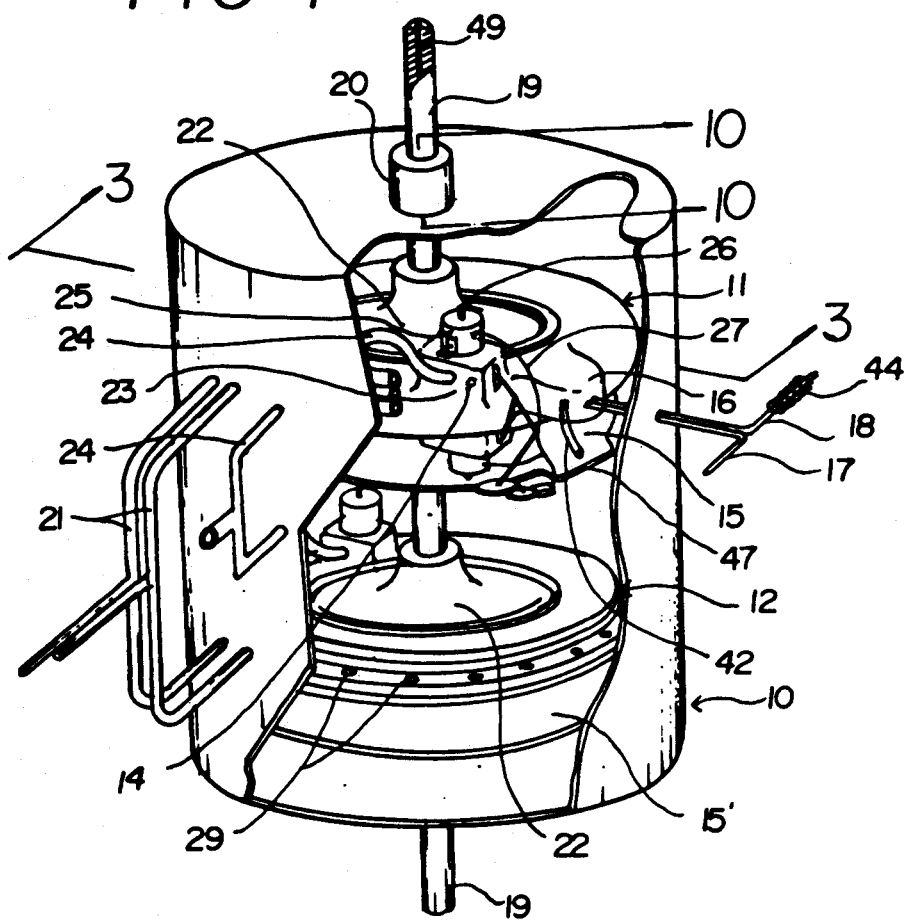
FIG. 1 is a perspective view of a rotary internal combustion engine according to the present invention containing cut-away portions in order to illustrate the construction of the apparatus according to the present invention.
Figure 2:
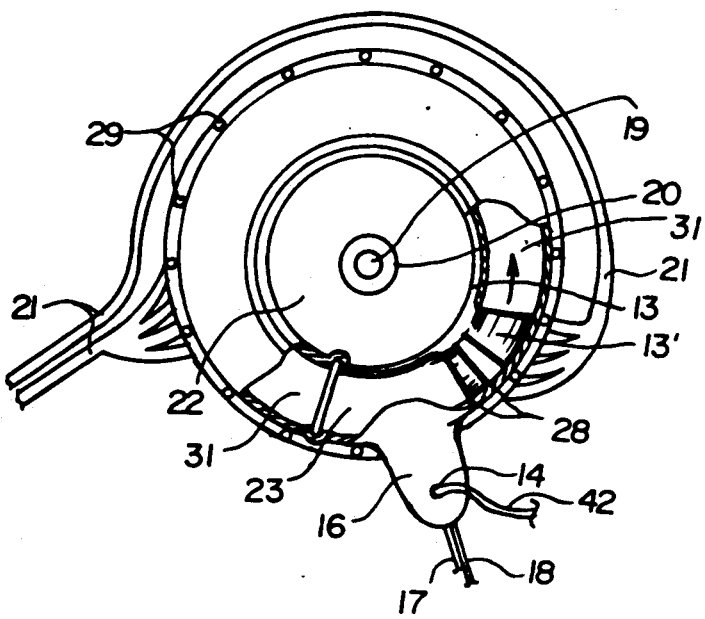
FIG. 2 is a top plan view of a toroidal casing of the apparatus according to the present invention containing cut-away portions in order to illustrate the basic components disposed in the toroidal casing.
Figure 3:
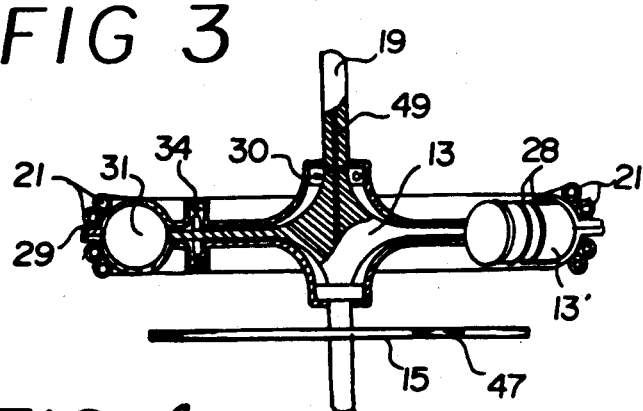
FIG. 3 is a cross-sectional view of FIG. 1, taken along line 3—3.

Referring now in detail to the drawings for the purpose of illustrating the preferred embodiments of the present invention, a rotary internal combustion engine as shown in FIGS. 1, 2, and 3 comprises a housing 10, an axle 19 mounted to rotate in the center of the housing 10, an upper toroidal casing 11 and a lower toroidal casing 12 both disposed in parallel to each other within the housing 10, and an upper valve plate 15 operatively associated with the upper toroidal casing 11 and a lower valve plate 15' operatively associated with the lower toroidal casing 12 and fixedly mounted to the axle 19, respectively. The upper and lower toroidal casings 11 and 12 define a space which rotatably contain a rotor 13 provided with a piston 13'. Each of the casings 11 and 12 is also provided with a respective chamber 31. The rotor 13 is fixedly mounted on the axle 19 and is journalled for rotation on the axle 19 generally in the counterclockwise direction as indicated by the arrow shown in FIG. 2 and the piston 13' is projected to extend into the chamber 31.

Figure 8:
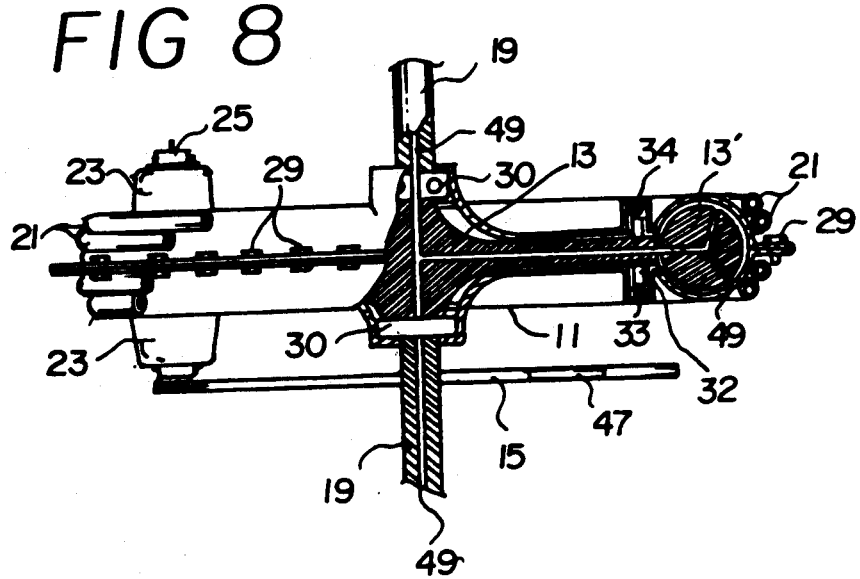
FIG. 8 is a front elevational view of the toroidal casing of the apparatus according to the present invention containing cutaway portions in order to illustrate basic components, particular oil supply conduits, disposed in the toroidal casing.

Also the upper and lower toroidal casings 11 and 12 include upper and lower initial explosion zones 23 which are extending the entire portion of the chamber 31 according to the rotation of the piston 13'. The upper initial explosion zone 23 is always located at the opposite side from the lower initial explosion zone 23 so that the upper and lower explosion zone 23 having an explosion function with respect to the compressed air-fuel mixture disposed therein make the axle 19 rotate substantially in the counterclockwise direction, respectively. The upper and lower toroidal casings 11 and 12 are provided with a plurality of refrigerating pipes 21 for cooling the respective chambers 31 by circulating a coolant therethrough (FIGS. 2, 3, and 8).

Figure 5:
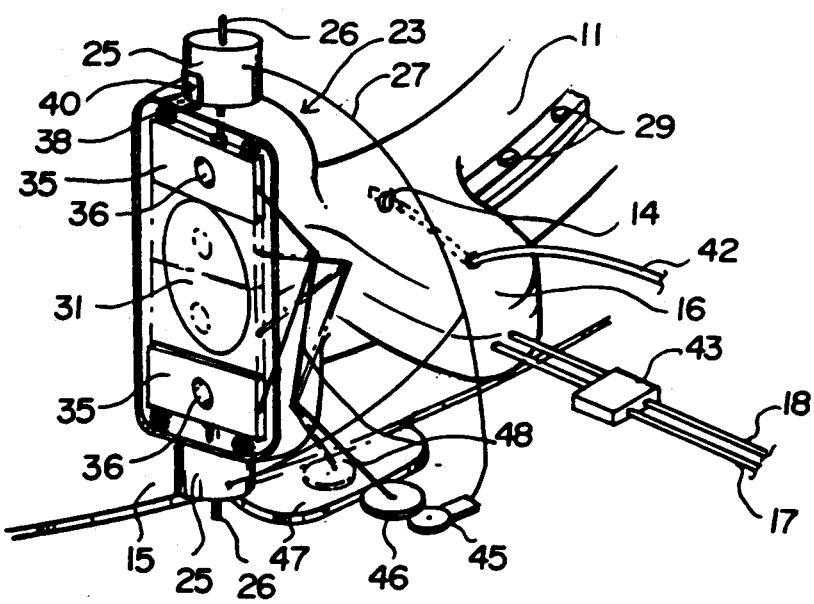
FIG. 5 is a perspective view of a valve member of the apparatus according to the present invention containing cut-away portions in order to illustrate the construction of the valve member.

As shown in FIGS. 1, 2, and 5, the initial explosion zone 23 is provided with a pair of valve doors 35 biased by a pair of valve springs 38 for forming an initial ignition and explosion zone 23 with the piston 13' only when the pair of valve doors 35 are closed. At that time, since each of the valve door 35 contains an L-shaped gas-exhausting aperture 36 having a horizontal inlet 36' disposed on the front wall and a vertical outlet 36" disposed on the top and bottom surface thereof, respectively, the L-shaped gas-exhausting aperture 36 is opened for exhausting the combusted gases so as to easilY rotate the piston 13, to forward in the direction as indicated by the arrow shown in FIG. 2. A gas intake pipe 17, an air intake pipe 18, and a glow or heater plug 14 connected to an electrical source (not shown) through an electric wire 42 are operatively connected to the explosion zone 23 where it is mixed with air and compressed fuel supplied through the gas and air intake pipes 17 and 18 to become a compressed air fuel mixture. Combusted gas outlet pipes 24 are disposed in the vicinity of the initial explosion zone 23 for exhausting the gases of combustion after the air-fuel mixture is exploded by ignition with the glow plugs 14, respectively. The air intake pipe 18 is wound by a heating coil 44 for initially heating the air.

The upper and lower valve plates 15 and 15' have peripheral surfaces which are provided with respective extended edge plates 47. The upper and lower toroidal casings 11 and 12 are provided with an upper and a lower raised portions 16 and 16' for containing the gas and air intake pipes 17 and 18, and electric coil 42 disposed therein. In the upper and lower toroidal casings 11 and 12, a connecting bent rod 48 is pivotally attached at one end to rod members extending from the pair of valve doors 35 and at the other end to a first roller 46 for travelling along the peripheral surface of the valve plate 15 and the extended edge plate 47. That is, when the first roller 46 travels along the extended edge plate 47, the valve doors 35 are opened whereas when the first roller 46 travels along the circumferential edge of the valve plate 15, the valve doors 35 are closed by the pivotal action of the connecting bent rod 38 and the rod members. Also, a second roller 45 is attached at one end of an electric wire 27 and a magnetic switch member 25 is attached at the other end of the electric wire 27. The second roller 45 which travels along the peripheral surface of the first roller 46 makes the magnetic member 25 function as a magnet through the electric wire 27. That is, a pair of magnetic attachments 40 pulls a pair of springs 38 attached to the top surface of the doors 35. Therefore, when the first rollers 46 rotate along the extended edge plate 47 of the upper and lower valve plates 15 and 15', the pair of valve doors 35 are open for passing the pistons 13' along the chambers 31, respectively. At that time, the second rollers 45 rotate along the first roller 46 which defines the "off" position of the on/off switch 43 for stopping the supply of compressed gas through the gas intake pipe 17 and air through the air intake pipe 18. On the other hand, when the pair of valve doors 35 are closed, the initial ignition and explosion zone 23 is formed between the closed valve doors 35 and the piston 13'. At that time, the on/off switch 43 is in an open position and the airfuel mixture is supplied to the ignition and explosion zone 23.

Figure 7:
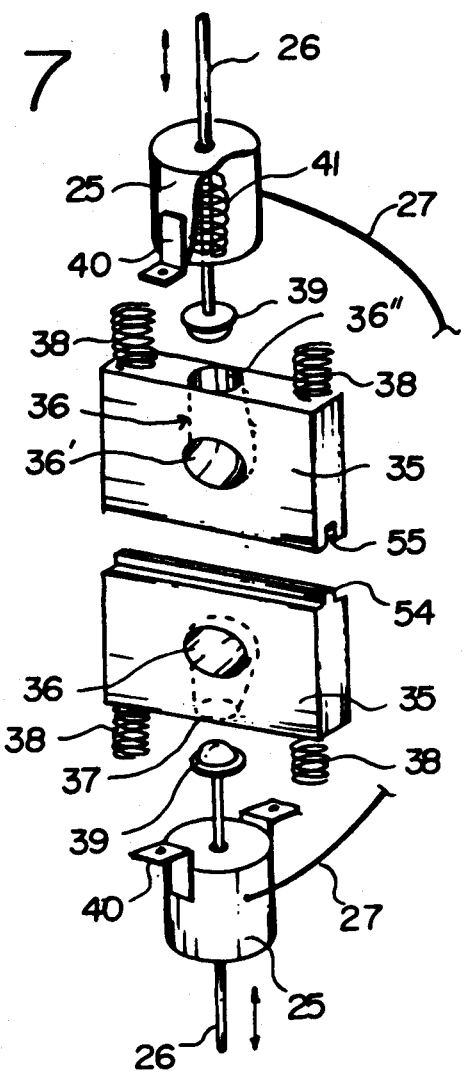
FIG. 7 is a perspective view of the valve member of apparatus according to the present invention containing cut-away portions in order to illustrate a pair of gas-exhausting apertures disposed in a pair of valve doors of the valve member.

As shown in FIGS. 5 and 7, the magnetic member 25 are provided with an up and down rod 26 having a closure 39 disposed at one end of the rod 26 for closing the vertical outlet 36" while the second roller 45 does not rotate along the first roller 46 and the valve doors 35 are closed in the direction as indicated by the arrow shown in FIG. 7. Thus, each of the magnetic switch member contain a magnetic coil 41 for being actuated to function as a magnet so as to keep the up and down rod 26 while the pair of valve doors 35 are closed.

Figure 6:
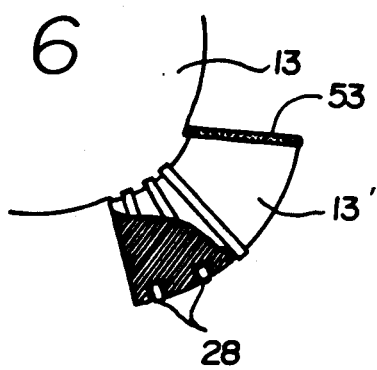
FIG. 6 is a top plan view of a piston of the apparatus according to the present invention.
Figure 11:
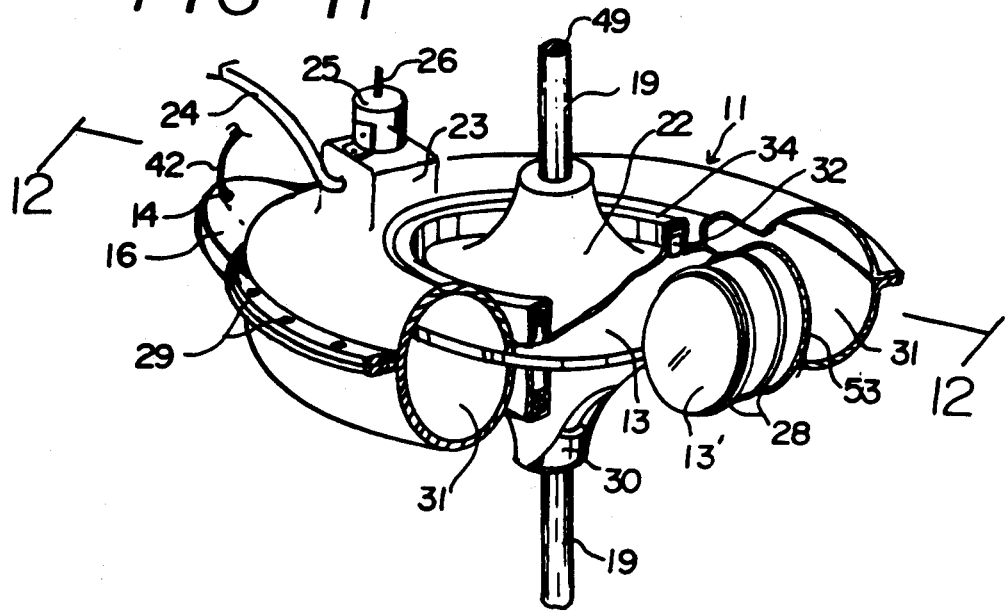
FIG. 11 is a perspective view of the toroidal casing of the apparatus according to the present invention containing cut-away portions in order to illustrate a rotor having a piston which is slidably rotated along the toroidal casing.
Figure 12:
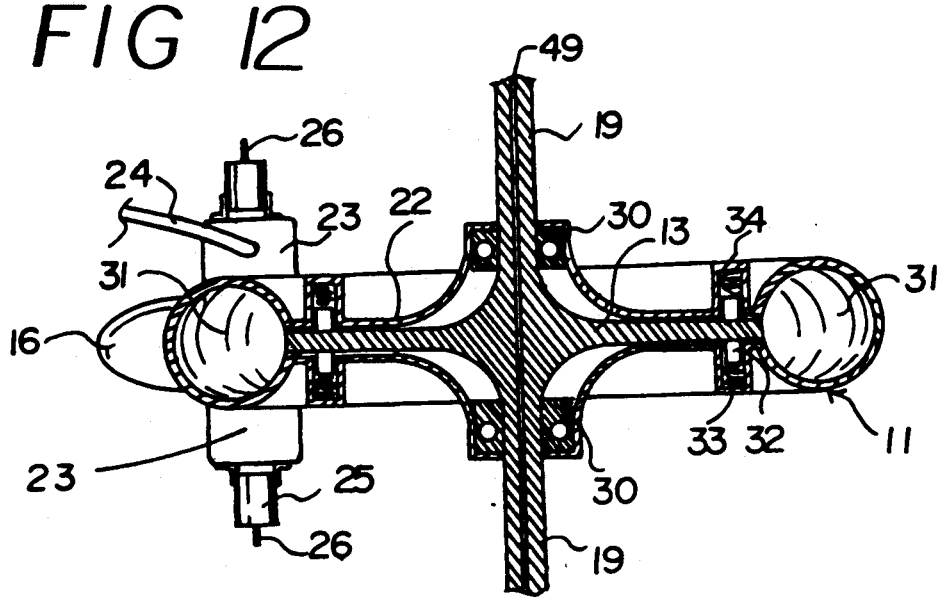
FIG. 12 is a cross-sectional view of FIG. 11, taken along line 12—12.
Figure 13:
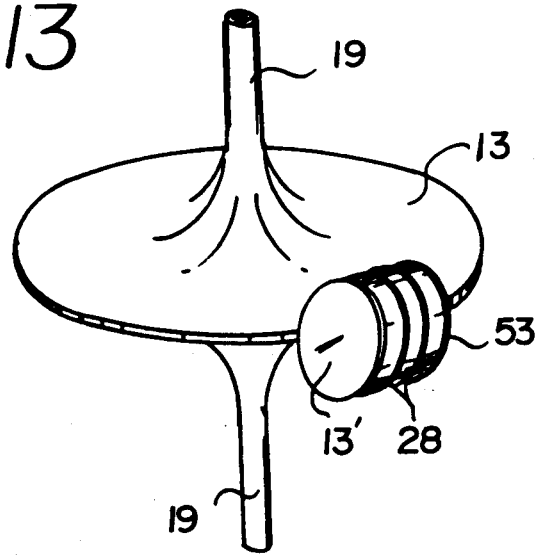
FIG. 13 is a perspective view of the rotor having the piston of the apparatus according to the present invention.

As shown in FIGS. 6, 11, and 13, the pistons 13' contain a plurality of sealing rings 28 and an asbestos sealing ring 53 for preventing the flow of the air-fuel mixture between the pistons 13' and the chambers 31, respectively.

Figure 4:
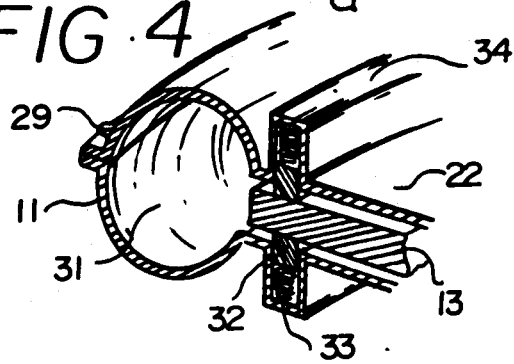
FIG. 4 is an enlarged, cross-sectional view of the left side portion of FIG. 3.
Figure 9:
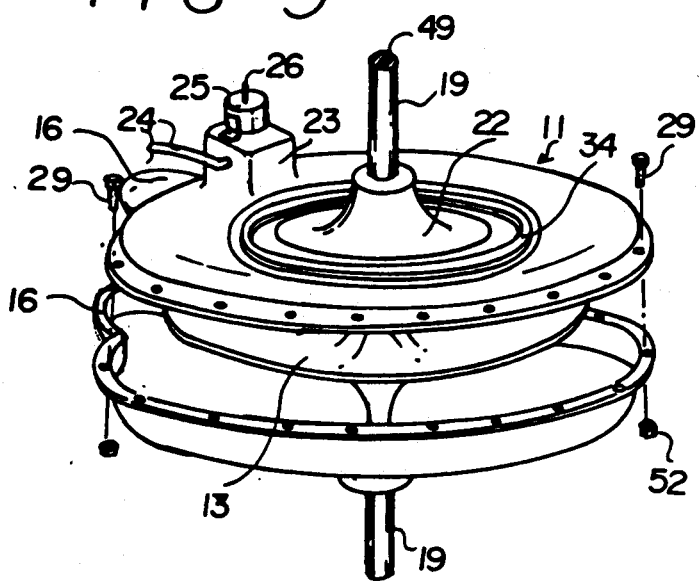
FIG. 9 is a perspective view of the toroidal casing of the apparatus according to the present invention.

The upper and lower toroidal casing 11 and 12 are assembled by bolts 29 and nuts 52 (FIG. 9). Also, the circumferential end portions disposed at the inside area of the upper and lower toroidal casings 11 and 12 have a raised configuration 34 for receiving spring 23 (FIG. 4). The upper and lower toroidal casings 11 and 12 have a lower cover 22 which extends from the raised configuration 34 of the outer surface of the chambers 31, respectively.

Figure 10:
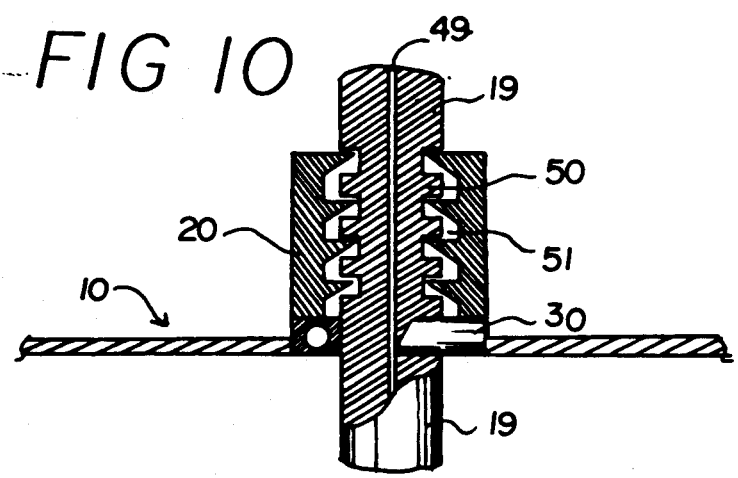
FIG. 10 is a sectional view of FIG. 1, taken along line 10—10.

As shown in FIG. 10, the axle 19 is rotatably mounted to the housing 10 through top and a bottom connecting members 20 with bearings 30. The connecting members 20 contain a plurality of grooves 51 for mating with a plurality of teeth 50 disposed on the outer surface of the axis 19 for preventing compressed air from leaking from the housing 10. The connecting members 20 define two parts so that it is assembled by a conventional securing manner, respectively (not shown).

As shown in FIGS. 8, 11, 12, and 13, the rotors 13 having the pistons 13' disposed within the upper and lower toroidal casings 11 and 12 include a plurality of oil conduits 49 disposed in the center thereof, respectively for supplying lubricating oil between the chambers 31 and the, pistons 13' so as to lubricate the pistons 13'0 and prevent the pressurized air from leaking from end chamber 31. Also the rotors 13 are both provided with anti-leakage rings 32 disposed on the outer surface of the top and the bottom of a circumferential end portions thereof, respectively for preventing the compressed air from leaking from the chambers 31 after explosion of the compressed air-fuel mixture. The anti-leakage rings 32 are provided with a plurality of springs 33 mounted in the circular vane 34 for biasing the anti-leakage rings 32 against the rotors 13.

According to the present invention, the apparatus operates as follows:

As shown in FIG. 2, for example, the initial ignition and explosion zone 23 is formed in the upper toroidal casing 11 between the closed valve doors 35 and the piston 13, disposed near the closed doors 35. With the on/off switch 43 in the "on" position, the compressed air-fuel mixture is transferred from the gas intake pipe 17 and the air intake pipe 18 and the mixture is exploded by the spark plug 14. Thus, the piston 13' rotates strongly along the chamber 31 and, in turn, rotates the rotor 13 in the counterclockwise direction as indicated by the arrow shown in FIG. 2. At that time, since the initial explosion zone 23 of the upper toroidal casing 11 is always positioned opposite to that of the lower toroidal casing 12, the rotors 13 of the upper and lower toroidal casings 11 and 12 simultaneously rotate the axle 19 in the counterclockwise direction. Since the air-fuel mixture is continuously supplied to the ignition and explosion zone 23 where it is ignited by the spark plug 14, the mixture is continuously exploded so that the axle 19 rotates very fast in the counterclockwise direction. At this time, since the first roller 46 rotates along the extended edge plate 47, the valve doors 35 are closed by the connecting bent rod 48 and the closure 39 of the magnetic members 25 are opened the L-shaped gas-exhausting apertures 36, respectively. Therefore, the gases of combustion are exhausted through the gas outlet 24. Thus the upper and lower toroidal casings 11 and 12 rotate in the counterclockwise together in the opposite side from each other. The operation of the upper and lower toroidal casings 11 and 12 is repeated continuously so that the axle 19 rotates continuously. However, the speed of rotation of the axle 19 depends on the amount of airfuel mixture supplied by the gas intake and air intake pipes 17 and 18.

The engine of the present invention provides many advantages compared with the prior art devices, as follows:

(a) The structure of the engine according to the present invention is simple so that the weight of the internal combustion engine is light;

(b) the torque of the engine is increased and the vibration of the engine is reduced so that engine noise is substantially reduced;

(c) since the range of RPM is 1-500, the transmission of the engine has little gear group;

(d) any type of fuel can be used in the ignition chamber, such as gasoline, alcohol, propane gas, or the like; and (e) the heat efficiency can be increased.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A rotary internal combustion engine comprising:
a housing,
an axle mounted to rotate in the center of said housing,
a first toroidal casing having a first circular chamber disposed within said housing, said first toroidal casing containing a first rotor rotatably disposed therein, said first rotor being fixedly mounted to said axle,
a first piston connected to said first rotor and slidably engaged within said first circular chamber for slidably moving along said first circular chamber and including a plurality of oil conduits,
a second toroidal casing having a second circular chamber disposed in parallel with said first toroidal casing within said housing, said second toroidal casing containing a second rotor rotatably disposed therein, said second rotor being fixedly mounted to said axle,
a second piston connected to said second rotor and slidably engaged within said second circular chamber for slidably moving along said second circular chamber and including a plurality of oil conduits,
a first valve member and a second valve member disposed within said first and second toroidal casings, respectively, said first and second valve members including first and second valve doors with a pair of gas-exhausting apertures which are adapted to open or close so as to permit or prevent the piston from passing, respectively,
a first valve plate fixedly mounted to said axle and disposed in parallel with said first toroidal casing within the housing, said first valve plate having a peripheral edge portion and an extended edge portion for operatively guiding the rotation of a first valve roller therealong, said first valve roller being connected to said first valve doors through a first connecting member,
a pair of first magnetic members operatively associated with said first valve member and disposed in opposite side to each other about the first valve member within the housing, said pair of first magnetic members having a first up and down rod with a first closure for operatively opening and closing said pair of gas-exhausting apertures, respectively,
a second valve plate fixedly mounted to said axle and disposed in parallel with said second toroidal casing within the housing, said second valve plate having a peripheral edge portion and an extended edge portion for operatively guiding the rotation of a second valve roller therealong, said second valve roller being connected to said second valve doors through a second connecting member, a pair of second magnetic members operatively associated with said second valve member and disposed in opposite side to each other about the second valve member within the housing, said pair of second magnetic members having second up and down rod with a second closure for operatively opening and closing said pair of gas-exhausting apertrures, respectively,
a first auxiliary roller and a second auxiliary roller for operatively rotating along said first and second valve roller and connecting said first and second magnetic members through a electric wire, respectively so as to make the magnetic member activate and open and close the first and second valve doors,
refrigeration means are connected to said first and second toroidal casings through a wall of said housing for cooling the first and second chambers,
connecting means are connected to said first and said second toroidal casings through a wall of said housing for exhausting combustion gases from the first and second circular chambers,
first and second air and gas intakes are connected to said first and said second circular chambers, respectively for supplying a compressed air-fuel mixture to the first and second circular chambers, and
spark forming means associated with an ignition and explosion zone formed between said first and second pistons and said first and second valve members respectively, in said first and said second circular chambers, whereby the rotation of the rotor within the internal combustion engine is achieved by continuously transferring the compressed air-fuel mixture to the ignition and explosion zone in a closed valve door position, igniting and simultaneously exploding the mixture continuously, and continuously exhausting the gases of combustion in the closed valve door position and thereafter, the piston passes through the valve doors in an open valve door position and simultaneously, the gases of combustion do not exhaust, whereby rotation of the rotors together with the axle is achieved.

2. The rotary internal combustion engine of claim 1, wherein the housing is provided with a pair contacting members thereof at mutual contacting portions of the housing and axle, each of said pair of contacting members including a plurality of grooves which mate with a plurality of teeth disposed on the outer surface of the axle so as to prevent the pressured air from leaking therefrom.

3. The rotary internal combustion engine of claim 1, wherein each rotor is provided with a pair of anti-leakage rings which extend from the circumferential portions of the top and bottom surfaces thereof for preventing compressed air from leaking from the chamber.

4. The rotary internal combustion engine of claim 3, wherein the pair of anti-leakage rings are provided with anti-leakage springs for easily receiving the piston in the toroidal casing.

5. The rotary internal combustion engine of claim 1, wherein each rotor includes a plurality of oil conduits extending from said plurality of conduits of the first and second rotors, respectively, for supplying lubricating oil between the piston and the wall of the circular chamber and prevent the compressed air-fuel mixture from leaking from the circular chamber.

6. The rotary internal combustion engine of claim 1, wherein the periphery of each piston is provided with a plurality rings and at least one asbestos ring for preventing the pressurized air from leaking from the ignition and explosion zone.

7. The rotary internal combustion engine of claim 1, wherein the first and the second valve members contain a pair of valve doors connected to first and second valve rollers through a connecting rod for opening and closing the valve doors depending on the rotating position of the first and second valve rollers.

8. The rotary internal combustion engine of claim 7, wherein the valve doors open when the first and second rollers rotate along the extended ends of the first and second valve plates.

9. The rotary internal combustion engine of claim 1, wherein each of the gas-exhausting apertures has an L-shaped configuration and defines an inlet disposed on the front wall of the valve door for communicating with the chamber and an outlet disposed on the top surface of the valve door for communicating with the exhausting connecting means.

10. The rotary internal combustion engine of claim 7, wherein the pair of valve doors have a pair of springs for operatively connecting a pair of attachments of the magnetic members.

11. The rotary internal combustion engine of claim 10, wherein one of the pair of valve doors has a channel disposed on the bottom surface for mating with a rail disposed on the top surface of the other of the pair of valve doors so as to tightly close them together.

12. The rotary internal combustion engine of claim 1, wherein the means for introducing the air-fuel mixture to the first and second cylindrical casings include a first and second gas intake and air intake for introducing air and fuel for controlling the air-fuel mixture.

13. The rotary internal combustion engine of claim 1, wherein first and second on/off switches are connected to said first and second auxiliary rollers through first and second connecting rods for performing in the "on" or "off" position thereof depending on the rotating position of the first and second auxiliary rollers, whereby the air and compressed fuel is supplied to the ignition and explosion zone.

14. The rotary internal combustion engine of claim 11, wherein the on/off switch is in the "off" position when the first and second valve rollers rotate along the peripheral extended end portion of the first and second gas plates for stopping the supply of the air and compressed fuel to the ignition and explosion zone.

15. The rotary internal combustion engine of claim 1, wherein the means for refrigeration is a plurality of pipes which are provided with a circulating coolant for cooling the circular end chambers.

16. The rotary internal combustion engine of claim 1, wherein the first and second connecting rod member includes a pair of rod members extending from said pair of valve doors and a connecting bent rod pivotally attached to said rod members, respectively.

17. The rotary internal combustion engine of claim 1, wherein the spark forming means is a glow or heater plug.

* * * * *